Patented Mar. 12, 1929.

1,704,732

UNITED STATES PATENT OFFICE.

AUGUST EISENHUT, OF WIEBLINGEN, NEAR HEIDELBERG, AND ALBERT AUERHAHN, OF HEIDELBERG, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

MANUFACTURE OF VALUABLE ORGANIC PRODUCTS.

No Drawing. Application filed September 30, 1924, Serial No. 740,847, and in Germany October 6, 1923.

It has recently been shown that by the catalytic hydrogenation of oxids of carbon at an elevated temperature and pressure, when the catalysts and other conditions are suitably chosen, oxygenated products of a higher order than methyl alcohol can be obtained either alone or simultaneously with methyl alcohol.

Such oxygenated compounds of a higher order, which are liquids, for the greater part non-miscible with water, and chiefly consist of higher alcohols, obtained as aforesaid by the reaction of hydrogen with oxids of carbon with the assistance of proper catalysts, or fractions of such oily products, can be converted, according to the present invention, into very valuable organic products of a still higher order, by subjecting them to the action of condensing agents. Such agents may be of a most varied character, either alkaline, acid or neutral.

The said oily liquids or the products resulting from their condensation may be subjected to distillation, purification or any other suitable treatment.

The products obtained according to our invention are capable of manifold practical uses, for example as motor fuels, solvents for cellulose esters, natural or artificial resins of various kinds, for composing lacquers, varnishes or paints, as detergents and so on, for which purposes additions may be made of other solvents or diluents.

The following examples will show a few modes of carrying the invention into effect to which special performances our invention is, however, not limited. The parts are by weight.

*Example 1.*

A liquid product obtained by the catalytic hydrogenation of carbon oxids, consisting of methyl alcohol, higher alcohols, hydrocarbons and other products is partly distilled in vacuo and the distillate again distilled under atomspheric pressure and the fraction boiling at from 66 degrees to 72 degrees centigrade (at atmospheric pressure) is then boiled, with double its volume of concentrated hydrochloric acid under a reflux cooler for about an hour. An oily layer is formed, which when separated, washed with dilute alkali, and distilled with steam forms a slightly yellowish oil, boiling between 140 degrees and 155 degrees centigrade. It resembles in its properties turpentine oil and is capable of the same uses as the latter.

*Example 2.*

2 parts of an oily mixture of oxygenated products boiling between 108 degrees and 250 degrees centigrade, obtained by the catalytic hydrogenation of carbon oxids and freed from water, are heated to from 150 degrees to 180 degrees centigrade together with one part of zinc chlorid. The vapors are led through a cooler into a receiver where a watery and an oily layer are collected; the latter is continuously returned into the distilling vessel and heating continued until, after about 10 or 12 hours, the vapors, when condensed, no longer form a watery layer. The oily layer is then separated and distilled until the temperature is 260 degrees centigrade and the residue subjected to steam distillation whereby an additional quantity of oily distillate is obtained. The distillate amounting to about 60 per cent of the raw product is a nearly colorless oily liquid of a weakly acid reaction and is preferably shaken with dilute caustic alkali solution and fractionally distilled. The fraction distilling up to 200 degrees centigrade is colorless and has a substantially more pleasant smell than the crude oil or the corresponding fraction thereof. It is an excellent solvent for natural and artificial resins and especially for nitrocellulose. The residue left behind after the steam distillation is a brown-red thick liquid mass which after purification with ether and drying can be used as a resin for lacquers or varnishes. It may be treated with strong nitric acid at ordinary temperature and thereby converted into nitrated products which, depending on the time of the treatment, are tough or brittle and resin-like and may also be employed as a resin for lacquers.

Now what we claim is:

1. The manufacture of valuable organic products which consists in subjecting liquid oxygenated organic products of a higher order than methyl alcohol, obtained by the catalytic hydrogenation of carbon oxids under pressure, to a treatment with condensing agents.

2. The process of manufacturing valuable organic products which consists in separating the oily liquid obtained by the catalytic hydrogenation of carbon oxids under pressure and containing oxygenated organic compounds of a higher order than methyl alcohol, into fractions and treating the fractions with condensing agents.

In testimony whereof we have hereunto set our hands.

AUGUST EISENHUT.
ALBERT AUERHAHN.